(12) United States Patent
Maloney

(10) Patent No.: US 11,465,850 B2
(45) Date of Patent: Oct. 11, 2022

(54) DRUM SET STACKER

(71) Applicant: Michael Maloney, Wimberly, TX (US)

(72) Inventor: Michael Maloney, Wimberly, TX (US)

(*) Notice: Subject to any disclaimer, the term of this patent is extended or adjusted under 35 U.S.C. 154(b) by 165 days.

(21) Appl. No.: 17/094,273

(22) Filed: Nov. 10, 2020

(65) Prior Publication Data
US 2022/0144550 A1 May 12, 2022

(51) Int. Cl.
B65G 1/14 (2006.01)
B65G 57/00 (2006.01)
A47B 81/00 (2006.01)

(52) U.S. Cl.
CPC ............. B65G 1/14 (2013.01); A47B 81/007 (2013.01); B65G 57/005 (2013.01)

(58) Field of Classification Search
CPC ........ B65G 1/14; B65G 57/005; A47B 81/007
USPC ....................................................... 211/85.6
See application file for complete search history.

(56) References Cited

U.S. PATENT DOCUMENTS

| | | | | |
|---|---|---|---|---|
| 2,797,774 A * | 7/1957 | Charles | ................ | B60T 3/00 D12/217 |
| 3,476,260 A * | 11/1969 | Jay | ................ | A47B 81/007 211/85.18 |
| 3,677,436 A * | 7/1972 | Danielson | ............ | B65D 19/44 108/55.3 |
| 3,747,780 A * | 7/1973 | Schneider | ............ | B65D 19/44 108/55.3 |
| 4,293,605 A * | 10/1981 | Persson | .................. | B65G 1/14 428/126 |
| 4,488,649 A * | 12/1984 | Mark | .................. | A47B 81/007 211/49.1 |
| 4,506,796 A * | 3/1985 | Thompson | ............ | A47B 81/007 108/55.3 |
| 4,788,777 A * | 12/1988 | Davis | .................. | F26B 25/185 34/518 |
| 4,984,690 A * | 1/1991 | King | ................ | B65D 21/0224 248/172 |
| 5,722,626 A * | 3/1998 | Menchetti | ............ | F26B 25/185 248/346.4 |
| 5,813,137 A * | 9/1998 | Townsend | ................ | B27F 1/02 248/346.02 |
| 5,873,460 A * | 2/1999 | Reinhardt | ............ | B65G 57/005 414/789.5 |
| 6,134,803 A * | 10/2000 | Gilchrist | ................ | F26B 25/185 34/239 |
| 6,517,926 B1 * | 2/2003 | Therrien | .................. | B65G 1/14 428/113 |
| 6,799,926 B1 * | 10/2004 | Ross | .................... | B65G 57/005 410/38 |

(Continued)

FOREIGN PATENT DOCUMENTS

CA 2307464 A1 * 10/2000 .............. B65G 1/14
CA 2307699 A1 * 11/2000 ........... B65G 57/005
(Continued)

Primary Examiner — Stanton L Krycinski
(74) Attorney, Agent, or Firm — Nolte Lackenbach Siegel

(57) ABSTRACT

The present disclosure describes a drum stacking assembly configured to allow stacking of drums for storage or transportation. The drum stacking assembly generally includes an extendable stacker device configured to be positioned between drums in a stack to support drums in the stack in a manner where the weight of the drums are supported on the rim portion of the drums and not the heads.

8 Claims, 3 Drawing Sheets

(56) References Cited

U.S. PATENT DOCUMENTS

| | | | | |
|---|---|---|---|---|
| 7,003,898 B2* | 2/2006 | Aaron | ............... | F26B 25/185 |
| | | | | 34/518 |
| 7,641,059 B2* | 1/2010 | Gracia Lecina | ......... | B65G 1/14 |
| | | | | 211/85.22 |
| 7,926,199 B2* | 4/2011 | Aaron | ............... | F26B 25/185 |
| | | | | 248/346.02 |
| 8,118,180 B2* | 2/2012 | Van Belkom | ............ | B60T 3/00 |
| | | | | 211/59.3 |
| 8,475,095 B2* | 7/2013 | Quick | ............... | B65D 71/0096 |
| | | | | 410/47 |
| 9,027,755 B2* | 5/2015 | Jones | ................ | B65D 21/0224 |
| | | | | 206/503 |
| 9,851,148 B2* | 12/2017 | Templeman | ........ | B29C 48/0022 |
| D807,153 S * | 1/2018 | Templeman | ................ | D8/354 |
| D826,694 S * | 8/2018 | Templeman | ................ | D8/354 |
| 10,046,884 B1* | 8/2018 | Erschen | ............... | B65D 19/385 |
| 10,234,203 B2* | 3/2019 | Townsend | ............... | F26B 25/185 |
| 10,745,216 B2* | 8/2020 | Wagner | ................ | F26B 25/185 |
| 2001/0000875 A1* | 5/2001 | Townsend | ................ | B65G 1/14 |
| | | | | 144/371 |
| 2019/0263560 A1* | 8/2019 | Diaz | ................ | B65D 19/44 |

FOREIGN PATENT DOCUMENTS

| | | | | |
|---|---|---|---|---|
| CH | 602440 A5 * | 7/1978 | | |
| DE | 951345 C * | 10/1956 | | |
| DE | 1756054 A1 * | 2/1970 | | |
| DE | 4447127 A1 * | 3/1996 | ........... | B65G 57/005 |
| DE | 10056422 A1 * | 5/2002 | ........... | B65G 57/005 |

* cited by examiner

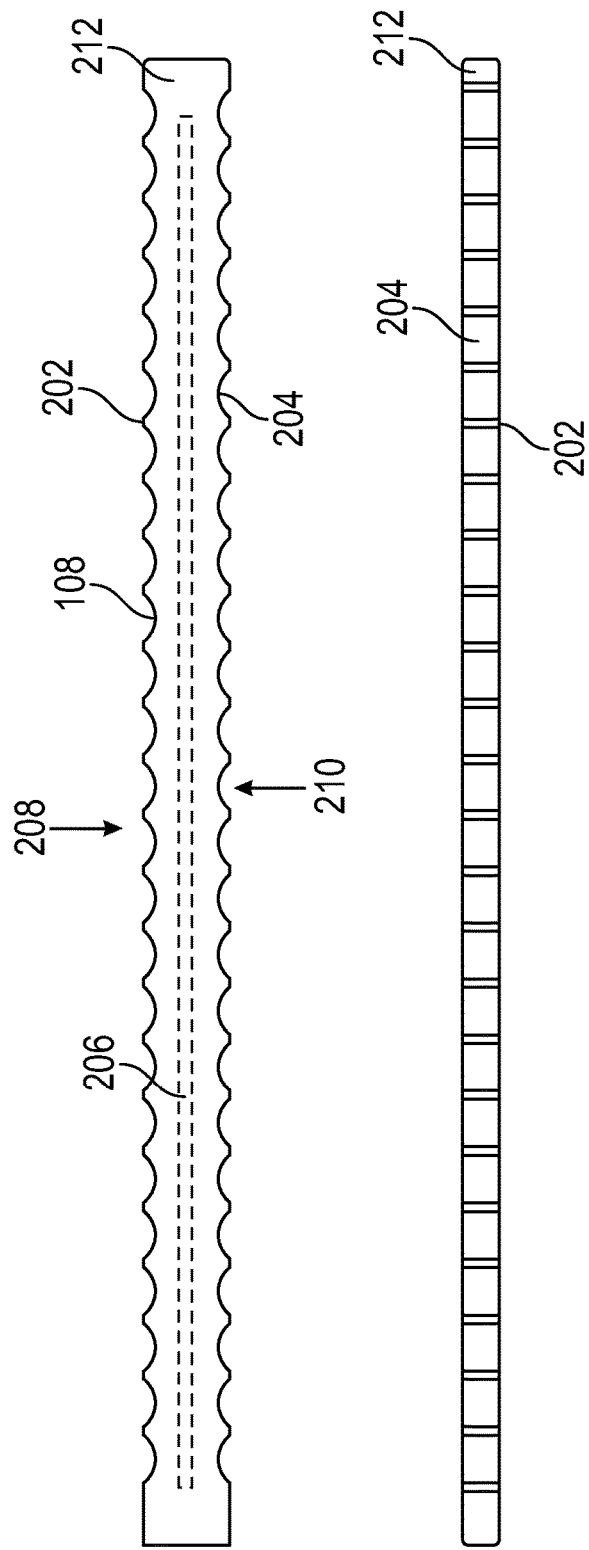
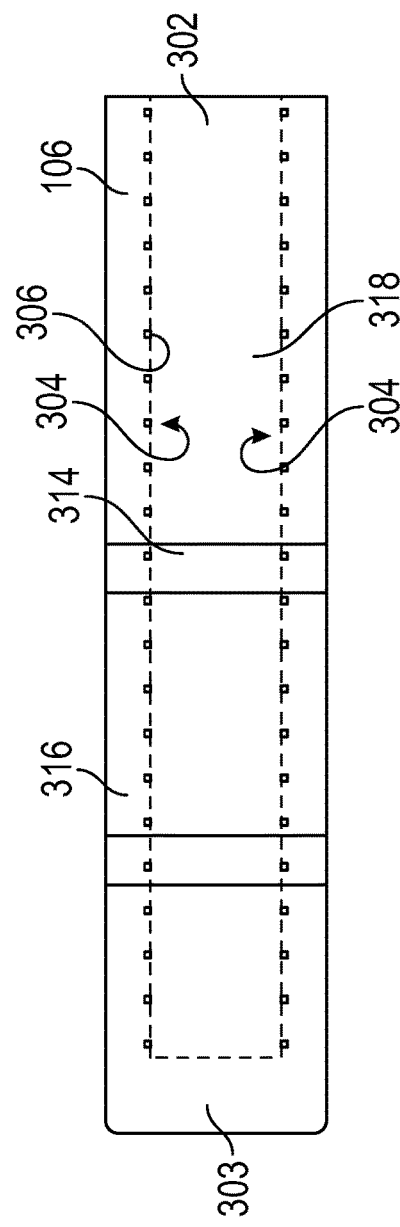
FIG. 2
FIG. 3A

DRUM SET STACKER

BACKGROUND

A drum kit or drum set is a collection of drums and cymbals that are set up on stands to be played by a single player with drumsticks held in both hands and feet operating pedals that control a hi-hat cymbal and a bass drum. A drum kit consists of a mix of drums of different sizes tat each create a different tone or sound. For example, a typical drum kit may contain a snare drum mounted on a stand and placed between the player's knees; a bass drum played by a foot operated pedal; two or more toms mounted above the bass drum; a hi-hat opened and closed with a foot pedal; and one or more stand mounted cymbals.

One challenge with drum kits is due to the size of the drums themselves, as bass drums are often 1 to 2 feet in diameter, snare drums are over foot diameter, and toms range from 6 inches to nearly 2 feet in diameter. More particularly, the size of drums creates challenges for storing and or transporting drums, as they take up so much space in storage or transportation mediums. Often times musicians tried to stack drums for storage, but stacking has been found to degrade the quality of the drum heads, as when a smaller drum is stacked on top of a larger drum, the weight of the smaller drum is supported solely by the larger drum's head, which is a sensitive part of the drum that creates the sound and can be easily deformed or damaged.

As such, there is a need for a method and or apparatus to stack drums for storage or transportation that protects the drums from head damage.

BRIEF DESCRIPTION OF THE DRAWINGS

The present disclosure is best understood from the following detailed description when read with the accompanying exemplary Figures that are representative of various exemplary embodiments of the disclosure.

So that the manner in which the above recited features, advantages and objects of the present invention are attained and can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments

FIG. 2 illustrates a top and side views of an exemplary stacker connector of a stacker assembly of the present disclosure;

FIG. 3A illustrates a top view of an exemplary stacker end component of a stacker assembly of the present disclosure;

DETAILED DESCRIPTION

Figure 1:
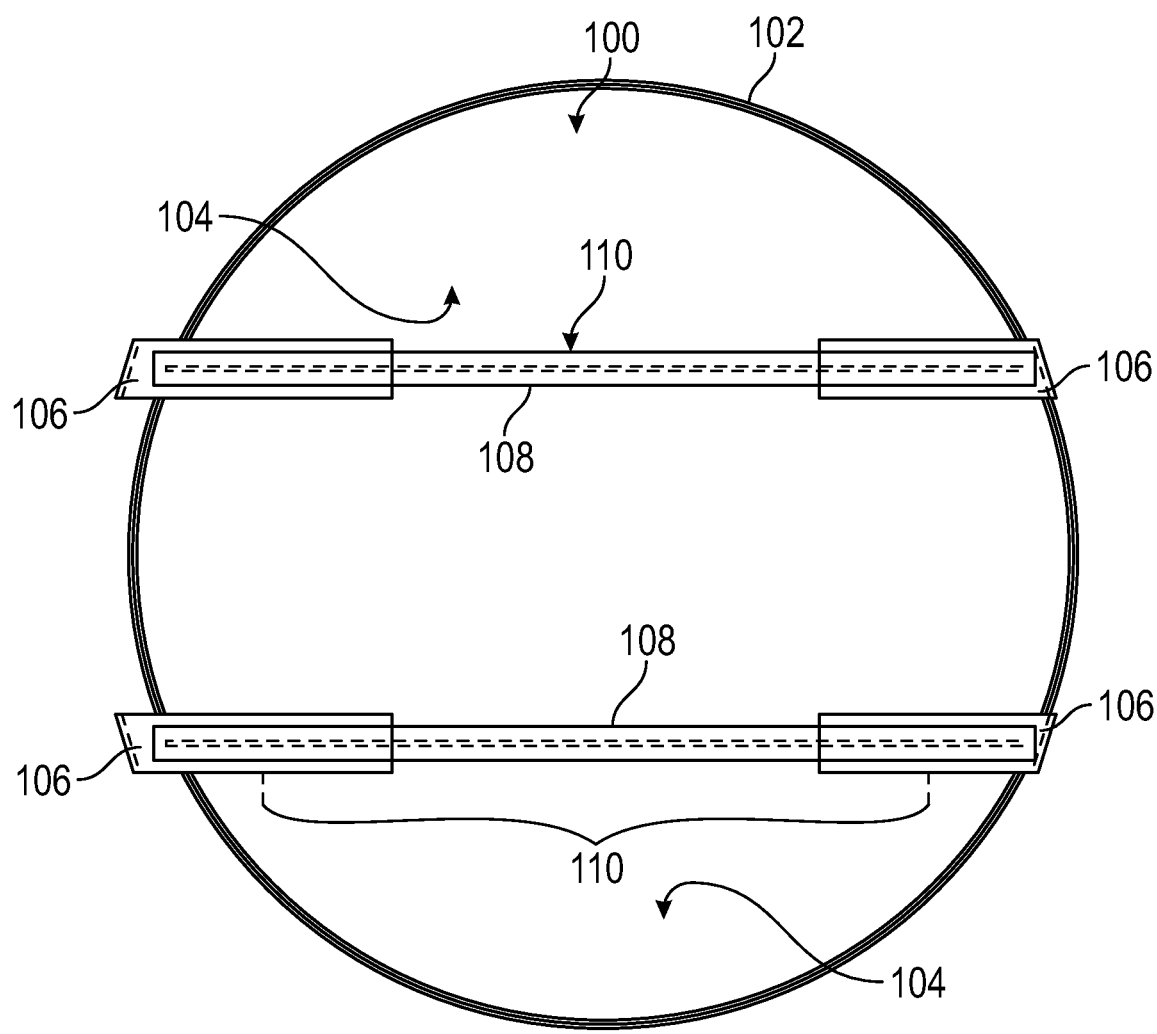
FIG. 1 illustrates a top view of an exemplary assembled drum stacker assembly pair positioned on top of a drum rim in accordance with embodiments of the present disclosure.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

The following disclosure resolves deficiencies in the prior art for being able to properly store and or transport drum kit components, and specifically the actual drums themselves. The following disclosure describes a drum stacker assembly that allows a user to stack multiple drums one on top of another in a manner that does not in any way impact the integrity of the drum head surfaces so as to maintain the drum's proper sound. More particularly, the drum stacker assembly described herein allows users to stack drums upward from the floor in a largest to smallest diameter configuration, whereby the drum stacker assembly of the present disclosure is positioned between each drum in the stack. Therefore, the drum stacker assembly operates to transfer the weight of, for example, the $2^{nd}$ drum in a drum stack downward to the $1^{st}$ drum in the drum stack, but the weight transfer is done in a manner that does not impact the drum head (the sensitive sound producing surface of the drum). The drum stack may continue upward from larger diameter to smaller diameter drums, with a drum stacker assembly positioned between each consecutive drum in the stack.

One point of novelty of the drum stacker assembly of the present disclosure is that the drum stacker assembly transfers the weight of each drum in the stack downward to the drum immediately below, but the weight transfer is done without any contact with the drum head surface. More particularly, the drum stacker assembly of the present disclosure allows for a drum to sit on top of the drum stacker assembly, thus the load of the drum weight is supported by the drum stacker assembly. The supported drum weight is then transferred outward, radially outward, to terminating ends of the drum stacker assembly that engage the drum rim or outer band. Thus, the weight of the drum stack above the drum stacker assembly is transferred to the drum rim or outer band without touching the drum head surface.

Another point of novelty of the drum stacker assembly of the present disclosure is that the drum stacker assembly is able to adjust in size to accommodate various sizes of drums. More particularly, drums are typically stacked from large diameter to small diameter, with the large diameter drum being on the bottom of the stack. Therefore, the drum stacker assembly positioned immediately on top of the largest drum, which will typically be the base drum, must be of sufficient length to span the diameter of the larger drum. As the drums reduce in diameter going upward in the stack away from the floor, the drum stacker assembly required length decreases. As such, various embodiments of the drum stacker assembly disclosed here in provided drum stacker assembly that is adjustable in length to accommodate various sizes of drums.

This provides a unique advantage in that the user is not required to use a single length of stacker assembly that would protrude well beyond the outer diameter of the smaller drums in the upper portion of the stack. Using the novel adjustable length drum stacker assembly of the present disclosure allows for the user to extend the length of the drum stacker assembly to the exact length needed to support the drum stack, without having significant protrusions past the edge of the drum stack. Removing the protrusions past the edge of the drum stack substantially reduces the likelihood of damage to the drum stack due to passersby or other incidental contact with the drum stack that can cause the stack to fall or otherwise be damaged.

Another point of novelty of the drum stacker assembly of the present disclosure is that the drum stacker assembly may have outer surfaces (top and bottom of the stacker end portions) that are frictional, meaning that the services engage the drums in the stack and prevent the drums from sliding longitudinally with respect to the drum stacker assembly; but also that the outer surfaces may be manufactured from material that is deformable, in that when the drum is stacked on top of the drum stacker assembly the outer surface material may deform slightly where the drum sits, which acts as a sort of padding or cushioning mechanism to further protect the integrity of the drums in the stack. The cushioning material may be any type of rubber, foam, or sponge material configured to slightly deform up on weight being positioned thereon. The deformation of the material may also serve as a shock absorption mechanism so that the drums may be further protected during transportation should the drum stacker assembly of the present disclosure be used on drums during transportation.

FIG. 1 illustrates a top view of an exemplary assembled drum stacker assembly pair positioned on top of a drum rim in accordance with embodiments of the present disclosure. In this figure, the stacker assemblies 110 are positioned on top of a drum 100 in a configuration such that the stacker assemblies 110 only touch the rim 102 of the drum 100. The stacker assembly 110 does not contact the drum head 104 at any point. The stacker assembly 110 generally includes stacker ends 106 that are positioned opposing each other, and a stacker connector 108 that connects the respective stacker ends 106 together. The stacker end 106 receives the stacker connector 108 therein in a slidable fashion. Therefore, with two stacker end portions 106 connected interstitially by a stacker connector 108 that is slidably received within each stacker end 106, the stacker assembly 110 is able to be adjusted along the longitudinal axis of the stacker connector 108 to increase or decrease the overall length of the stacker assembly 110. As the stacker assembly 110 is positioned on top of a drum 100, the stacker end portions 106 contact the drum rim 102 and do not touch the drum head 104. This allows for additional drums 100 to be stacked on top of the stacker assembly 110 and transfer the weight of the drum stack through the stacker assembly 110 through to the drum rim 102 without exerting any force or weight onto the sensitive drum head 104. This provides significant drum storage advantages, as removing the drum head 104 as a weight bearing surface for drums stacked there on it eliminates the potential for damaging or otherwise deforming the drum head 104, which significantly impacts the sound generated from the drum head 104.

FIG. 2 illustrates a top and side views of an exemplary stacker connector 108 of a stacker assembly 110 of the present disclosure. The stacker connector 108 generally includes an elongated member having equally spaced ridges or peaks 202 along the elongated parallel sides. A plurality of equally spaced troughs or valleys 204 are positioned between the ridges or peaks 202, thus creating a sawtooth type repeating surface typography. The end portions 212 of the stacker connector 108 may be somewhat rounded or have smooth edges thereon. The center portion 206 of the stacker connector 108, when viewing the stacker connector 108 longitudinally, may include a gap or space that separates the $1^{st}$ side 208 from the $2^{nd}$ side 210. The gap or space in the center aperture 206 may extend longitudinally along the axis of the stacker connector 108 substantially from one end portion 212 to the other end portion 212. This structural configuration allows the stacker connector 108 to be flexible from side to side in a direction that is perpendicular to the longitudinal axis of the stacker connector 108. More particularly, the $1^{st}$ and $2^{nd}$ sides 208, 210 may be pushed or squeezed towards the center aperture 206, thus reducing our closing the gap or aperture 206 between the $1^{st}$ and $2^{nd}$ sides, while also causing the ridge or peaks 202 to move toward the central aperture 206 of the stacker connector 108. As will be described further herein, this flexibility allows the ridges or peaks 202 to act as a ratcheting mechanism configured to longitudinally secure the stacker connector 108 into the stacker end 106 when the stacker connector 108 is slidably inserted into the stacker end 106.

FIG. 3A illustrates a top view of an exemplary stacker end 106 of a stacker assembly 110 of the present disclosure. The stacker end 106 includes an open end 302 that is sized and shaped to longitudinally receive the stacker connector 108 therein. The open end 302 communicates to a hollow interior portion 318 of the stacker end 106. The interior walls 304 of the stacker end 106 form the hollow interior portion 318 that is configured to receive the stacker connector 108 therein. The interior portion 318 is configured to slidably receive the stacker connector 108 therein such that there is a minimal amount of tolerance or clearance between the outer surfaces of the stacker connector 108 and the interior walls 304. The stacker end 106 may be generally rectangular in shape where the longitudinal axis of the rectangular shape coincides with the longitudinal axis of the hollow interior portion 318. The opposing rectangular sides of the stacker end 106 may be substantially open such that you can essentially see through the stacker end component 106. For structural integrity, the stacker end component 106 may have a plurality of cross members 314 connecting the opposing sides of the stacker end 106 to provide structural integrity to the component.

The interior walls 304 of the stacker end 106 may include recesses 306 and/or peaks 312 to facilitate the ratcheting functionality discussed above. More particularly, as the stacker connector 108 is inserted into the stacker end 106, the external peaks 202 on the stacker connector 108 may engage the recesses 306 on the interior walls 304 of the stacker end 106. As the stacker in 106 slides into the stacker connector 108 the peaks may slide longitudinally until they reach the recesses 306. When a peak meet reaches a recess 306, the peak point will engage the recess in a ratcheting function, thus inhibiting further slidable motion of the stacker connector 108 within the stacker in 106. This ratcheting function may be overcome by applying additional force to the stacker end 106 that is sufficient to overcome the frictional force created by the engagement of the peak 202 into the recess 306. The ratcheting function is enabled by the connector 108 flexing to reduce the width of the center aperture 206 as the peaks 202 slide over the recesses 306.

As such, the peaks and recesses allow for a ratcheting function that may be used to regulate the length or depth that the stacker connector 108 is inserted into the stacker end 106. If the user would like to have a longer stacker assembly so as to position the assembly over a larger diameter drum, then the stacker ends 106 which are positioned on opposing ends of a stacker connector 108, may be pulled outwardly to extend the length of the stacker assembly 110. This length extension occurs as the stacker connector 108 is pulled out of the hollow interior portion 318 of the stacker end 106, thus lengthening the overall length of the stacker assembly 110. Therefore, the ratcheting mechanism of the 2 stacker ends 106 and the stacker connector 108 operate to provide a stacker assembly 110 that is adjustable in length to accommodate essentially any diameter of drum for stacking. The ratchet function also operates to secure the assembly in position when a peak 202 engages a recess 306, 310.

Figure 3B:
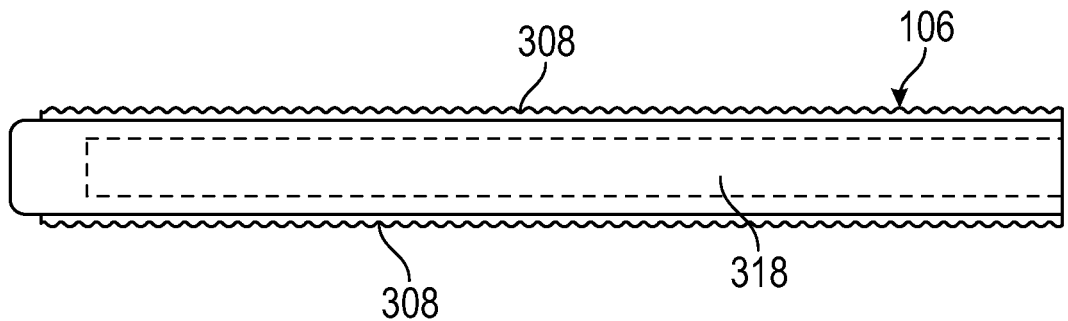
FIG. 3B illustrates a side view of an exemplary stacker end component of a stacker assembly of the present disclosure.

FIG. 3B illustrates a side view of an exemplary stacker end component of a stacker assembly of the present disclosure. The side view further illustrates the hollow interior portion 318 of the stacker end 106. Further, the side view illustrates where a frictional surface 308 may be applied to an outer portion of the stacker end 106. This frictional surface 308 is the surface that is configured to frictionally engage the rim of drums being stacked together. The frictional surface 308 may be on the top and bottom (opposing) sides of the stacker end 106. As such, the frictional surface 308 on the bottom side may engage a drum being stacked that is supporting the weight, while the frictional surface 308 on the top side of the stacker end 106 may engage the lower rim surface of a drum being supported in the drum stacked by the lower drum. The frictional surface 308 is generally configured to engage the drum rim 100 and to in a manner that prevents the drums from sliding on the stacker assembly 110 relative to each other, while also providing a soft or cushion type surface that prevents any damage to the drum rim 102. Further, the frictional surface 308 engages the drum rim 102, but does not touch the drum head 104 so as to prevent any damage or alteration of the drum head and the resulting sound that is emanated therefrom. The frictional surface 308 may also operate to cover our close the sides of the stacker end 106 such that one cannot see through the stacker end 106. The frictional surface is supported by the general frame of the stacker in 106 in conjunction with the cross members 314, such that the stacker and 106 is enclosed by the frictional surface 308 and also the frictional surface 308 is supported sufficiently to be able to support drums being stacked thereon.

Figure 3C:
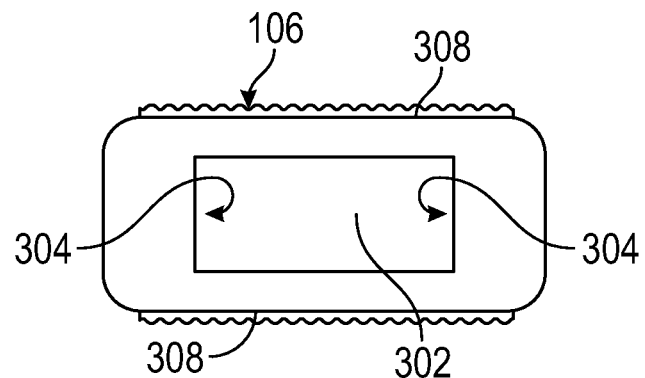
FIG. 3C illustrates an end view of an exemplary stacker end component of a stacker assembly of the present disclosure.

FIG. 3C illustrates an end view of an exemplary stacker end component 106 of a stacker assembly 110 of the present disclosure. The end view clearly illustrates the open end 302 of the stacker end 106. The open end 302 is sized and shaped to receive the stacker connector 108 there in, and as such, the cross-section of the stacker connector 108 very closely matches the shape of the open end 302 of the stacker end 106. The end view also shows the positioning of the frictional surface 308 on the top and bottom surfaces of the stacker end 106. The services containing the frictional surface 308 are the services that are configured to engage the rim 102 of the drum 100. The end view also clearly shows the interior walls 304 that are used to frictionally engage the stacker connector 108 when it is slidably received therein. These end walls may have recesses 306 or arc shape recesses 310 and peaks 312, whichever combinations functions to provide the ratcheting functionality described above with regard to receiving the stacker connector 108 therein.

Figure 3D:
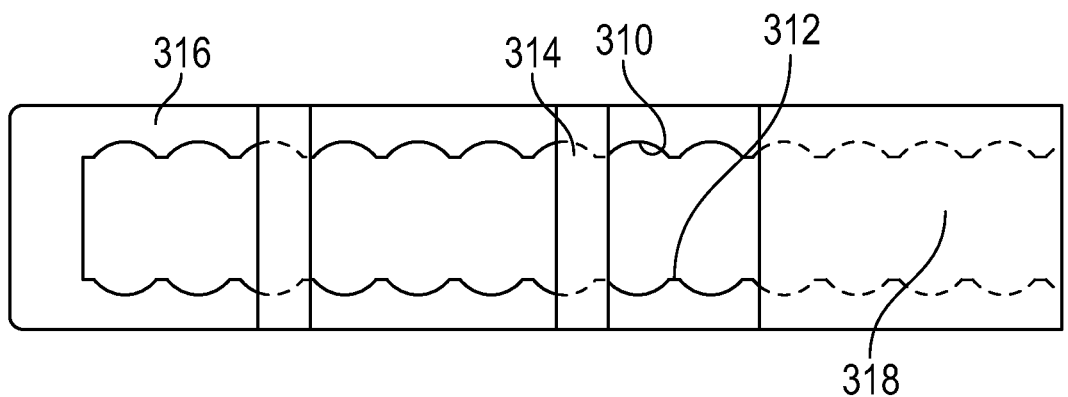
FIG. 3D illustrates a top view of an exemplary stacker end component of a stacker assembly of the present disclosure.

FIG. 3D illustrates a top view of an exemplary stacker end component 106 of a stacker assembly 110 of the present disclosure. In this embodiment, the interior walls 304 of the stacker in 106 are equipped with arc shape recesses 310 and peaks 312 to support the ratcheting function when the stacker end 106 is inserted therein. As noted above, the stacker end 106 may have ridges or peaks 202 extending therefrom that may functionally engage the peaks 312 or arc shape recesses 310 to perform the ratcheting function of the stacker connector 108 being inserted or removed from the stacker end 106. Again, the ratcheting function is used to selectively determine the length of the overall stacker assembly 110 so as to be able to apply the stacker assembly 110 to various diameters of drums 100 in a stack.

The stacker assembly 110 may be manufactured from any one of a number of materials. In one embodiment, the stacker assembly 110 may be manufactured from a plastic material that may be, for example, a printed material. The plastic may be rigid enough to maintain shape and strength, while also writing enough flexibility that the stacker connector 108 may be squeezed on its outer sides to bend in the middle thus collapsing or reducing the diameter of the center aperture 206 to assist with the ratcheting function of embodiments of this disclosure. In other embodiments, the stacker assembly 110 may be manufactured from a relatively hard rubber, a wooden material, and even a metal or alloy material. Inasmuch is the stacker assembly 110 may be 3-D printed, it is contemplated that 3-D printable plastic materials may be a preferred material for efficient and cost-effective manufacturing of the device. The frictional surface 308 of the stacker assembly 110 may be a soft rubber material configured to slightly deform upon being engaged with a drum 100. The frictional material 308 may also be a foam material, a carpet like material, or other soft and mildly deformable material that may be used to frictionally engage a drum and prevent physical damage thereto.

As noted above, a preferred method for manufacturing the stacker assembly 110 may be to 3-D print the stacker end 106 and the stacker connector 108. As such, the stacker assembly 110 may be manufactured from a plastic material. In another embodiment of this disclosure of the stacker assembly 110 may be injection molded from a plastic material commonly used in injection molding processes. In yet another embodiment the stacker assembly 110 may be mailed or otherwise formed from a solid block of material, such as plastics, metals, or alloys.

The stacker assembly 110 may be used to safely store and/or secure a plurality of drums 100 from a drum kit. To use the stacker assembly 110, the user first puts the largest diameter drum on the floor other hard surface where it is desired to store the plurality of drums from a drum kit. The user then extends to pieces of the stacker assembly 110 out to a link that is slightly greater than the diameter of the largest drum that forms the base of the drum stack. The extended stacker assemblies 110 are then set on top of the drum 100 with the lower frictional surface 308 contacting the rim 102 of the drum. Then a $2^{nd}$ drum to be put in the stack is set on top of the stacker assembly 110 and supported by the stacker assembly 110. The $2^{nd}$ drum 100 and the stack is supported on its rim 102 by the upper frictional surface 308 of the stacker assembly 110. This stacking process may be continued through multiple drums and multiple stacker assemblies 110.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s). Likewise, any reference to "the invention" shall not be construed as a generalization of any inventive subject matter disclosed herein and shall not be considered to be an element or limitation of the appended claims except where explicitly recited in a claim(s).

While the foregoing is directed to embodiments presented in this disclosure, other and further embodiments may be devised without departing from the basic scope of contemplated embodiments, and the scope thereof is determined by the claims that follow

What is claimed is:

1. A drum stacking assembly, comprising:
   a first and second stacker end portions, each stacker end portion having:
      an elongated substantially rectangular cross section;
      a substantially rectangular cross sectional interior hollow portion;
      a plurality of equally spaced recesses formed into opposing interior longitudinally extending walls in the hollow portion;
      and end wall enclosing one end of the interior hollow portion;
      a rectangular opening positioned opposite the end wall in the hollow portion; and
      a frictional surface on two opposing exterior sides; and
   a stacker connector having;
      an elongated substantially rectangular cross-sectional member with a hollow central aperture along a longitudinal axis of the stacker connector, the hollow central aperture connecting two opposing sides of the stacker connector along the entire length of the central aperture, and
      two external surfaces immediately adjacent the two opposing sides having equally spaced peaks along the external surfaces that correspond in spacing to the recesses.

2. The drum stacking assembly of claim 1, wherein the plurality of equally spaced recesses formed into opposing interior longitudinally extending walls in the hollow portion comprise arc-shaped recesses defining a plurality of equally spaced hollow portion peaks.

3. The drum stacking assembly of claim 2, wherein the equally spaced hollow portion peaks and interstitial arc-shaped recesses cooperate with the equally spaced peaks along the external surfaces to ratchet when the stacker connector is inserted longitudinally in the rectangular opening of the stacker end portions.

4. The drum stacking assembly of claim 3, wherein terminating ends of the stacker connector are each received in the rectangular opening of individual stacker end portions to form a three-piece stacker assembly.

5. The drum stacking assembly of claim 4, wherein the terminating ends of the stacker connector slide longitudinally on the stacker connector in a ratchet operation to lengthen or shorten an overall length of the three-piece stacker assembly.

6. The drum stacking assembly of claim 5, wherein the stacker connector and the stacker end portions are three-dimensionally printed out of a plastic material.

7. The drum stacking assembly of claim 6, wherein the frictional surface on the two opposing exterior sides of the stacker end portions comprises a rubber material configured to at least slightly deform upon receiving a weight of a drum thereon.

8. The drum stacking assembly of claim 5, wherein the frictional surfaces are sized and shaped to engage an upper surface of a rim of a lower drum in a drum stack and a lower surface of a rim of an upper drum stacked on the lower drum in a manner where a drum head of the lower drum does not support any weight of or otherwise contact the upper drum.

* * * * *